US010965817B1

(12) United States Patent
Stokes

(10) Patent No.: US 10,965,817 B1
(45) Date of Patent: Mar. 30, 2021

(54) SYSTEM FOR AUTOMATIC TEXT MESSAGING

(71) Applicant: Adam Stokes, Las Vegas, NV (US)

(72) Inventor: Adam Stokes, Las Vegas, NV (US)

( * ) Notice: Subject to any disclaimer, the term of this patent is extended or adjusted under 35 U.S.C. 154(b) by 0 days.

(21) Appl. No.: 16/983,555

(22) Filed: Aug. 3, 2020

Related U.S. Application Data

(60) Provisional application No. 63/044,391, filed on Jun. 26, 2020.

(51) Int. Cl.
H04M 7/00 (2006.01)
H04M 3/42 (2006.01)

(52) U.S. Cl.
CPC ....... *H04M 7/0042* (2013.01); *H04M 7/0012* (2013.01); *H04M 7/0051* (2013.01);
(Continued)

(58) Field of Classification Search
CPC ............. H04M 7/0042; H04M 7/0051; H04M 7/0012; H04M 2203/651; H04M 2203/252; H04M 2203/654; H04M 3/42059; H04M 2201/40; H04M 1/72552; H04M 1/72547; H04M 2201/60; H04M 1/72519; H04M 2203/253; H04M 2203/4536; H04M 2250/74; H04M 3/42204; H04M 3/4228; H04M 3/42382; H04M 3/53; H04M 3/53333; H04M 3/537; H04M 1/72583; H04M 1/663; H04M 1/6075; H04M 1/64; H04M 1/27453; H04M 11/04; H04M 1/247; H04M 1/27475; H04M 2201/42; H04M 2203/5027; H04M 2250/22; H04M 2250/62; H04M 3/42068; H04M 3/42161; H04M 3/42221; H04M 3/42289; H04M 3/5116; H04M 3/563; H04M 3/564; H04M 7/0075; H04M 3/42365; H04M 3/493; H04M 3/4938; H04M 3/5166; H04M 3/5183; H04M 3/5191; H04M 11/10;
(Continued)

(56) References Cited

U.S. PATENT DOCUMENTS

2003/0212747 A1\* 11/2003 Meyer .................... H04L 51/24
709/206
2006/0246957 A1\* 11/2006 Lim .................. H04M 1/72436
455/566

(Continued)

*Primary Examiner* — Akelaw Teshale
(74) *Attorney, Agent, or Firm* — Bruce A. Lev

(57) ABSTRACT

A system and method of automatically sending text messages that supplement the content of an ongoing voice telephonic phone call. The automatic text messages include content sent to a calling party during and after the telephonic phone call. The system and method automatically send text messages to the telephone number utilized by a person who places a telephone call to another person or business. The telephone number dialed by the calling party is identified as the source of the automatic text message received by the calling party during the voice telephonic call. The content of the text message received by the calling party is relevant to the purpose of the ongoing telephonic phone call. The automatic text messaging system creates a 24/7 direct method of communication between businesses and customers, and vice versa, and between any parties to communications, without anyone entering a telephone number into a texting system.

26 Claims, 9 Drawing Sheets

(52) U.S. Cl.
CPC .... *H04M 3/42059* (2013.01); *H04M 2201/40* (2013.01); *H04M 2203/252* (2013.01); *H04M 2203/651* (2013.01); *H04M 2203/654* (2013.01)

(58) Field of Classification Search
CPC ........... H04M 1/2535; H04M 1/72569; H04M 15/06; H04M 1/6091; H04M 1/642; H04M 1/7253; H04M 1/7255; H04M 1/72566; H04M 1/72597; H04M 2201/18; H04M 2203/2027; H04M 2242/30; H04M 2250/60; H04M 2250/68; H04M 3/42195; H04M 3/42348; H04M 3/436; H04M 3/53308; H04M 15/55; H04M 2203/554; H04M 2207/20; H04M 3/42153; H04M 3/4234; H04M 3/4931; H04M 3/51; H04M 3/53366; H04M 3/42391; H04M 1/2475; H04M 1/72478; H04M 3/4878; H04M 3/5175; H04M 1/72433; H04M 2203/2061; H04M 1/72436; H04M 2201/405; H04M 3/5158; H04M 7/003; H04M 1/72454; H04M 3/44; H04M 3/5231; H04M 1/6008; H04M 1/724; H04M 2203/1058; H04M 2203/655; H04M 3/42042; H04M 3/42187; H04M 3/42246; H04M 3/4936; H04M 7/0048; H04M 11/06; H04M 1/271; H04M 2201/39; H04M 2201/41; H04M 2203/2072; H04M 3/2218; H04M 3/2281; H04M 3/38; H04M 7/0039; H04M 15/08; H04M 1/2748; H04M 2203/652; H04M 3/487; H04M 7/0066

See application file for complete search history.

(56) References Cited

U.S. PATENT DOCUMENTS

| | | | |
|---|---|---|---|
| 2010/0119049 A1* | 5/2010 | Clark | H04M 3/42153 379/201.01 |
| 2014/0057610 A1* | 2/2014 | Olincy | H04M 3/42365 455/414.1 |
| 2015/0201313 A1* | 7/2015 | Celik | H04W 4/12 455/414.1 |
| 2016/0127534 A1* | 5/2016 | Celik | H04M 1/72436 455/566 |
| 2018/0183920 A1* | 6/2018 | Celik | H04M 1/724 |
| 2020/0159995 A1* | 5/2020 | Mukherjee | G06F 40/289 |

* cited by examiner

SYSTEM FOR AUTOMATIC TEXT MESSAGING

CROSS-REFERENCE TO RELATED APPLICATION

The present application is related to and claims priority from prior provisional application Ser. No. 63/044,391, filed Jul. 1, 2020 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of communicating and automatically text messaging between a business and a calling party while the calling party is actively on a voice telephone call with the business, and wherein the text message content is supplemental to the purpose and conversation of the voice telephone call.

2. Description of the Related Art

Various prior art telephone systems use text messaging to communicate between users. Among these are: U.S. Pat. No. 9,374,693 to Olincy et al; U.S. Publication No. 2019/0245969 to Wang; and U.S. Publication No. 2011/00320960 to Cai et al.

The closest reference of Olincy uses software with text message content that is selected by the person who has received a voice phone call on a cell phone where its software is installed. Olincy allows the called party to select whether any text message is sent to the calling party. Olincy also allows the called party answering the voice phone call to determine the content of any text message sent to the calling party. Within Wang, the text message is sent by the calling party and not by the party receiving the voice phone call. And within Cai, an automatic text message is sent as a reply to text messages received, and not as the reply to an inbound voice telephone call.

Referring more specifically to the closest and most pertinent reference of Olincy, the most important differences between the instant invention are:

1. The instant invention improves live voice-phone-call communications whereas the Olincy system sends a message to caller concerning a missed telephone call. The instant invention automatically sends a text message to the caller (the party who places the phone call) during the voice phone call with text content relevant to the purpose of the voice telephone call. The Olincy system sends a message to the caller to reschedule a missed or declined telephone call. The instant invention is different because it improves ongoing telephone calls by automatically and simultaneously combining voice and text communication between the same parties. The Olincy system does not supplement ongoing voice conversations and does not send a text message during a live voice telephone call.

2. Timing and type of communication sent:
    The Olincy system will automatically respond to a missed telephone call with a recorded audio message or text message. The instant invention does not respond to missed phone calls. Instead, the instant invention will automatically send a text message during a live phone call with content relevant and supplemental to the ongoing voice telephone call.

3. Party answering the live telephone call:
    The instant invention can be used whether a person or a phone system auto-attendant answers an incoming telephone call. The Olincy system patents do not function with an auto-attendant system because the Olincy system responds to missed or declined phone calls. An auto-attendant phone system never misses a telephone call as it is a computer system designed to never miss phone calls. Therefore, the Olincy system does not offer this functionality of sending a supplemental text message during the live voice call regardless of who or what system answers the incoming voice telephone call.

4. Management control and reliability:
    The system of the instant invention is set by a business' management to automatically send the desired text message to each person who places a telephone call to the business. This maintains consistency in communications to all parties calling the business. The content of text message sent to the caller is determined by call purpose selected by the caller (new customer, current customer, supplier, department selected, etc.). Text message content can also be set to be determined based upon other data not directly related to the caller's express purpose of the voice phone call (time of phone call, date of phone call, outside temperature or other weather conditions at the time of the phone call, etc.). Embodiment variations could also include additional text messages sent to the caller during or after a live voice phone call with content based upon artificial intelligence systems and/or other data supplied by external sources.

The Olincy system does not enable the caller to select the text message sent to the caller. Instead, the person answering the telephone call using the Olincy system decides by himself/herself if a message should be sent to the caller. Therefore, the submitted system removes all text related decisions from the person answering the phone call because this system's programs automatically send a text message and the desired text message content. This is unlike the Olincy system that allows the person answering the phone call to decide which text message content, if any, will be sent to each caller. The instant invention resolves the problems of business management not knowing if an employee is sending a text message at all and not knowing if the correct text message content is sent to the caller. Keep in mind, the Olincy message is not sent during the ongoing voice telephone call. As the Olincy system allows the called party to select the content of text message sent, that system does not allow for text content to be determined by a computer system (artificial intelligence) or to determine content with data from third party sources.

5. Record Keeping:
   The instant invention will maintain records of callers who, during telephone calls and when applicable, opt-in or opt-out of receiving text messages. The submitted system will, through an associated and incorporate texting company software, also track all text messages sent to and from each person who places a phone call to the business. These text messages can then be incorporated into the business client file management or sales system. The Olincy system does not offer an opt-in or opt-out option to callers concerning receiving text messages. The Olincy system does not automatically create a text message thread between a business and a caller where the text messages would or should be maintained in the business records for each caller. The Olincy system appears limited to maintaining records of texts sent to reschedule missed telephone calls and this is exceedingly different from a system capable of tracking all text communications between parties for text messages sent during live voice phone calls. The instant invention also provides to the management information such as the purpose other data of each phone call received at the business for use in a variety of applications including employee training and scheduling and for comparing incoming telephone call numbers to company sales and scheduling data. The Olincy system does not inform management as to the purpose of the phone call received.

6. Location and functionality of Software:
   Olincy is a software installed on a specific cell phone to respond to phone calls received by that specific cell phone telephone system hosting both voice and text services for that telephone number called. The instant invention is comprised of two applications located on an internet-based server and not on a cell phone. The applications read data resulting from an inbound telephone call placed by a caller to a called number with voice phone call service provided by a telephone company. The applications then select pre-written text messages to supplement the purpose of the underlying voice telephone call. The applications then cause the text message to be sent to the caller's telephone number from a texting company distinct from the telephone company receiving the voice phone call. The Olincy system must be installed on each cell phone answering inbound phone calls. The submitted system can be installed once on a telephone network system to allow all phone calls received to result in an automatic text message without concern, as is the case of Olincy, whether or not the system is installed on each cell phone receiving telephone calls.

7. Compatibility with telephone system and texting system:
   Olincy software is designed for cell phone application where the cell phone company controls both voice and text communication methods for a specific telephone number.
   The instant invention includes software for automatically sending text messages through a texting company separate and distinct from the telephone company receiving the underlying voice telephone call. Unlike the Olincy patent functioning on a cell phone system only, the submitted system can read telephone call data from many different telephone companies and then automatically send a text message using many texting companies different and unrelated to the voice telephone companies. The instant invention also allows the telephone number originally called by the caller to be shown as the outgoing texting telephone number although the texting company sending the text message did not receive the inbound phone call received by the telephone company.
   Olincy is software functioning on a specific cell phone operating on once cell phone system. The instant invention can be utilized in coordination with telephone calls received through traditional telephone systems or through VOIP telephone systems. It can even be functional with telephone calls received by toll free phone numbers and calls received inside and outside of the United States. The instant invention is not limited to cell phone service. Olincy software is suitable for the texting system to send a text message when a text or phone call is received on that cell phone. This means the Olincy patent works when the voice phone call system and texting system are both provided by the same cell phone company.
   Instead, the instant invention reads the data from a telephone call at one telephone company and selects a pre-written text message to be sent from a different company only handling the text messages. This means the Olincy system does not allow the user to substitute one telephone company for another while maintaining the same texting company for automatic text messages as the instant invention enables. Likewise, the Olincy system does not allow the user to substitute one texting company for another texting company while maintaining voice phone call services at the same telephone company as the instant invention enables.

8. Location of software and pre-written text messages:
   Olincy software is installed on a cell phone. Instead, the software of the instant invention comprises two applications operating from a server on the internet. Olincy stores pre-written messages on the cell phone using the service while the instant invention stores the messages on an online database. This allows our users to update pre-written automatic text messages at one location instead of having to update the messages on each cell phone using the Olincy service.

9. Automatic text message responses:
   Olincy is not fully automatic, must be installed on each specific cell phone, and must be activated on that cell phone. The user must press a button to select which text will be sent and the text messages sent are for rescheduling missed calls. The Olincy system is inoperable if the cell phone battery has no electrical charge. This is not the case with the instant submission because it operates over the internet and is not installed upon a battery powered cell phone.
   The instant invention's software cannot be varied by the person answering the voice telephone call. The software does not need to be installed on each telephone. Instead, this is installed in on a network level and applies to every call received on a telephone number at any location anywhere. The person answering the telephone call cannot disable the text messages as this is set at the telephone network level by business management. The person answering the telephone call cannot determine which text message is sent because this is already pre-determined by business management at the telephone system level. The pre-written text message that management desires to send is based upon the purpose of the phone call, as dictated by the caller party, and not by the person answering the voice telephone call.

Olincy allows the user of the cell phone employing Olincy software to decide, if desired by that user, which text message to send to each caller or texter to the cell phone. Instead, this submission does not allow the person answering the incoming telephone call to change which pre-written text message is automatically sent. The system of the instant invention allows management at a company to know and control precisely which pre-written message is sent to every person who calls the telephone number at the company. Management of a company using this submission always knows exactly which pre-written text message is sent and the reason for the underlying telephone call. The instant invention is designed to disallow the person answering the telephone call the flexibility which text message is sent, if any, to each caller. This system removes all control over all text messaging from a person answering an incoming telephone call. In this way, the submitted system is more automatic for business management than the Olincy system, which can be varied in use by the person using a cell phone to answer phone calls.

Olincy system needs to be activated and be turned on so it may be operated by the person using the cell phone. The instant submission is automatic and configured at the server level.

10. Purpose of the text message sent:

Olincy allows the user's cell phone to send a pre-written text or voice message in response to a call that is missed or when the call recipient is too busy to answer the telephone call. The Olincy system is designed to encourage scheduling missed calls when both parties are available. The instant invention is primarily focused upon sending a pre-written text message to the caller party who places a voice telephone call to supplement the ongoing telephone call. The instant invention allows voice telephone calls to be supplemented by the wide variety of materials that can be sent through text messages. Olincy does not do this. The instant invention permits the caller to see the text materials sent by text during the call in helping to answer the purpose underlying the phone call. Olincy is more suited for scheduling other voice telephone calls when the initial telephone call is not answered or the party receiving the telephone call is unavailable.

The Olincy system is designed to facilitate scheduling a new telephone call when both parties are available later. The instant invention automatically establishes a 24/7 communication link through text to support live ongoing communications and future communications. Customers and business owners, and vice versa, will have an ongoing system of text messaging each other at any time of the day or time so no communication is missed. The "phone tag" game is eliminated by using the submitted system. The Olincy system does not eliminate the possibility or missing communications between parties. The Olincy system also does not allow the possibility of text message content supplied by third party data suppliers or as dictated by a live person or artificial intelligence system through a live phone call.

11. Control over software usage and text message content:

The Olincy system must be launched by the cell phone user for the system to be active. The instant invention is not manipulated by the person answering the telephone call. The system of the instant invention has removed the possibility caused by the phone user controlling the automatic text message system because the system is not controlled at the level of the phone being answered. Only the management at the company receiving the inbound telephone call can activate or deactivate the submitted system operation. The instant invention literally has no on-off button usable by anyone answering a telephone call.

The Olincy system sends a pre-written text or voice response when the call recipient is busy. The Olincy system has the cell phone user pressing a "busy" button to notify the system to send the text message. The instant invention does not vary the sending of a pre-written text message based on whether the call recipient is busy or not. The instant invention sends a text message based upon the purpose of the underlying phone call without regard to the availability of the call recipient. The instant invention also sends the text message automatically without requiring a phone call recipient to press a button or anything else. There is no need for this feature in the instant invention because the texts are automatically sent by the system and not by the person answering the phone call.

The Olincy system will prevent the user of the cell phone called from selecting an automatic text message response when the user is driving an automobile. This safety feature is not a threat to the submitted system automatically sending a text message because in the submitted system there is no ability of the person answering a call to select which pre-written text message is sent. The Olincy system contains various pre-written text messages relating to current or future availability of the telephone call recipient to participate in the phone call conversation. The instant invention offers a far larger arrangement of pre-written text message content because these texts are based upon providing supplemental information to assist in the underlying telephone call. The instant invention sends text messages relating to the purpose of the telephone call and is not limited to text messages relating to caller availability to participate in the call. A variation of the instant submission's embodiment will incorporate third party data into text message content. A variation of the instant submission's embodiment will enable artificial intelligence to determine the content of additional text messages sent to the caller during a live voice phone call.

The Olincy system provides the pre-written message content because of the cell phone user pressing some button on the cell phone when a telephone call is received. The Olincy system requires the user to select which pre-written text message will be sent to the caller. The instant invention permits no action by the person answering the telephone call to activate the automatic text messages to be sent. One outstanding feature of the instant invention is the continuity and reliability the text messages will automatically be sent by the system without regard to the diligence or ability of the user receiving the underlying telephone call. Furthermore, the content of the pre-written and automatically sent text message will be established by company management and cannot be changed by person answering the phone call.

The Olincy system is not set to operate with auto-attendant telephone systems answering telephone calls. This likely explains why the pre-written text messages are so heavily determined upon the availability of the person answering the telephone call. The instant invention can have telephone calls answered by live operators or by an auto-attendant computer system that will answer the telephone calls at any time day or night.

The Olincy system provides the opportunity for the person receiving the telephone call to either cause the sending of a text message or not. The instant invention does not allow this permission to the person answering the telephone call.

The Olincy System does not allow for adherence to federal laws such as the Telephone Consumer Protection Act, which prohibits spam texts to consumers. The instant invention will allow callers to opt-in and/or opt-out from receiving text messages when appropriate, as determined by the user. The source of the text message automatically sent to a caller should also be familiar to the person who placed the telephone call because the text message will show as originating from the telephone number dialed by the caller in the underlying telephone call. Also, because the submitted system responds by text message to calls received, there is no likelihood of telephone users being barraged by text messages from unknown telephone numbers.

The instant invention currently automatically sends SMS and MMS text messages and will also automatically send RCS text messages when the RCS system is more fully implemented in the telephone community. The texting company selected is already retained to provide RCS messaging services when enabled system wide. The Olincy system makes no mention of the system's ability to differentiate the format of text messages sent to callers.

None of the above inventions and patents, taken either individually or in combination, can send text messages between a business and a calling party while the calling party is actively on the voice phone call with the business, and wherein the text message content is based upon the purpose and conversation of the telephone call. Thus, a need exists for an improved automatic text messaging system and method to accomplish these new features and requirements.

BRIEF SUMMARY OF THE INVENTION

In view of the foregoing disadvantages inherent in the known telephone texting systems, the present invention provides a novel system and method of automatically sending text messages to a caller's telephone number while the caller and the called party are engaged in an ongoing voice phone call.

The general purpose of the present invention, which will be described subsequently in greater detail, is to provide a system and method of automatically sending text messages to a telephone number of a person (the caller), with the text message originating from a called telephone number and while the parties are engaged in an active telephone call, and wherein the text message content is based upon the purpose and conversation of the telephone call. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a system and method for automatic text messaging, constructed and operative according to the teachings of the present invention.

Figure 1:
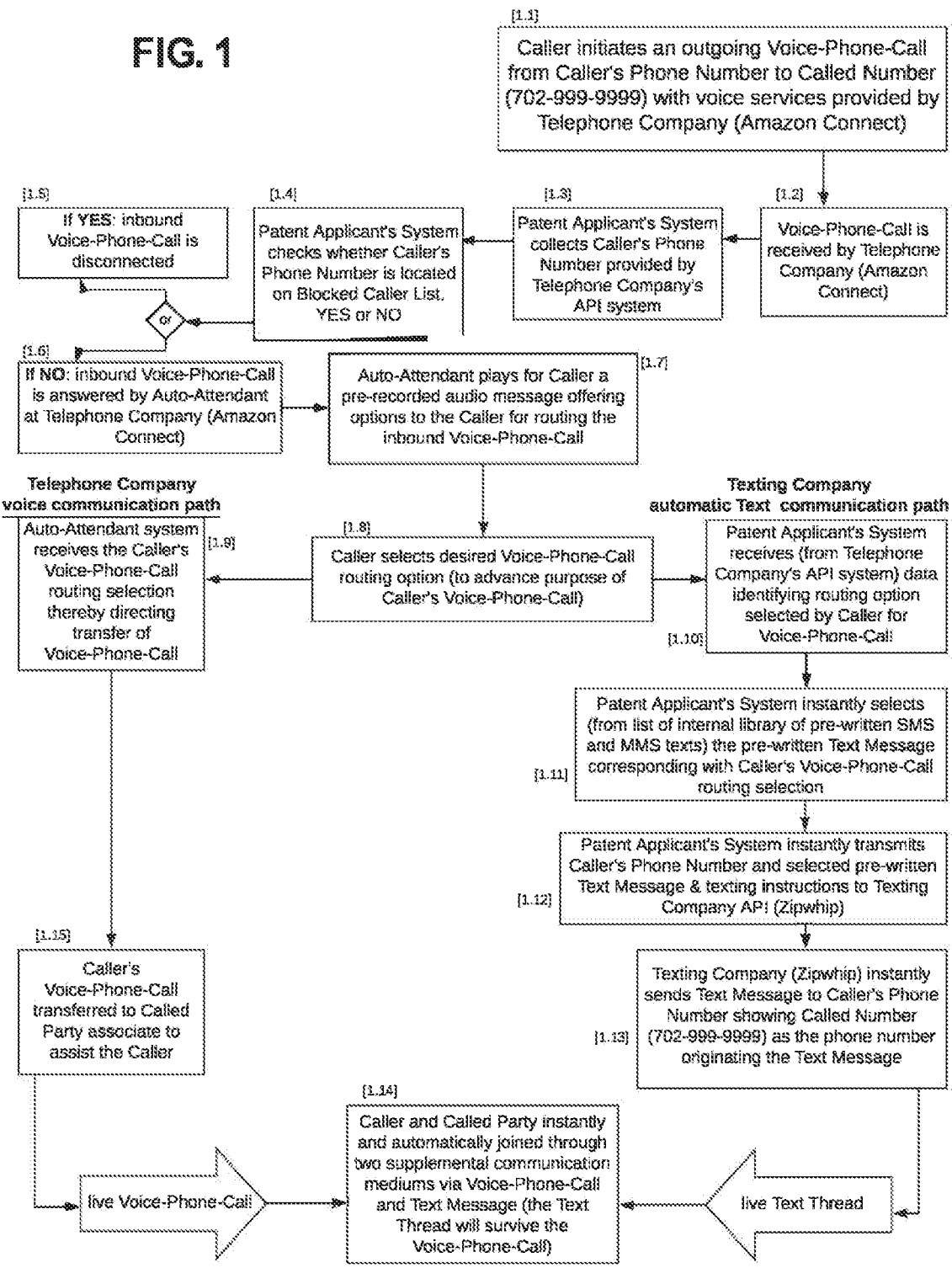
FIG. 1 shows a block diagram of the preferred embodiment of the instant invention demonstrating a use of the instant invention in response to an incoming Voice-Phone-Call along with blocks diagraming entities and systems involved in this usage.

The various embodiments of the present invention will hereinafter be described in conjunction with the appended drawings.

DETAILED DESCRIPTION

As discussed above, embodiments of the present invention relate to a system and method for automatically sending a text message to a person who calls a phone number while the calling party is actively on the phone call, and wherein the text messaging content is based upon the purpose and conversation of the telephone call.

Definitions of Terms Used:
API: As used in the Patent Application, the term "API" is used as an abbreviation for the "Application Programming Interface" and allows interactions between different software intermediaries. In these documents, API systems are used independently by Telephone Company, Texting Company, and Patent Applicant's System. Patent Applicant's System utilizes the Telephone Company API system to exchange data and instructions. Patent Applicant's System utilizes the Texting Company API system to exchange data and instructions.

Auto-Attendant: As used in the Patent Application, the term "Auto-Attendant" (or "auto attendant") is used to describe a system provided by the Telephone Company, Amazon Connect. Auto-Attendant is an abbreviation for automated attendant. This system allows a Caller's Voice-Phone-Call to be automatically routed to a phone system extension without the intervention of a live person receptionist.

Blocked Caller List: As used in the Patent Application, the term "Blocked Caller List" refers to a list of Callers' Telephone Numbers that will be disconnected (discontinued) when Patent Applicant's System recognizes such Caller Telephone Number as an inbound telephone call directed towards Called Number at Telephone Company. The Blocked Caller List was created and is updated by adding new Callers' Telephone Numbers to a database currently stored at Telephone Company. Additionally, the Blocked Caller List can be supplemented with a third-party list of spam and otherwise unwanted phone numbers.

Blocked Text List: As used in the Patent Application, the term "Blocked Text List" refers to a list of Caller Telephone Numbers already electing to opt-out of receiving automatic Text Messages generated through a Called Party's use of the Patent Applicant's System.

Called Number: As used in the Patent Application, the term "Called Number" (or "called number" or "number called") refers to the telephone number dialed by a Caller when initiating a Voice-Phone-Call to the Called Party. This term also refers to the telephone number utilized by the Called Party for Voice-Phone-Call service, which is provided by a Telephone Company. For this Patent Application, the Called Number refers to telephone number (702) 999-9999. For this Patent Application, the Called Number also refers to the telephone number from which a Text Message sent to the Caller's Phone Number appears to originate. Although the Called Number in this Patent Application is (702) 999-9999, this telephone number (702) 999-9999 is not actually part of the Patent Applicant's System as telephone numbers have existed long before this Patent Applicant's System. In fact, any specific Called Number outside of this Patent Application could refer to any telephone number a Called Party uses in connection with Patent Applicant's System. Patent Applicant's System can and will also substitute different telephone numbers as the Called Number in demonstrating the functionality of Patent Applicant's System.

A Called Number is utilized for voice communications and for texting communications. Texting and voice communications for the same Called Number are not provided by the same company in the example provided in the attached Embodiment.

Called Party: As used in the Patent Application, the term "Called Party" (or "called party") refers to the person or business receiving an inbound telephone call that was initiated by the Caller using the Caller's Phone Number. Called Party also refers to the person or business utilizing Patent Applicant's System to automatically send Text Messages to a Caller's Phone Number.

Caller: As used in the Patent Application, the term "Caller" (or "caller") refers to a person who initiates a Voice-Phone-Call to a Called Party utilizing the Patent Applicant's System.

Caller's Phone Number: As used in the Patent Application, the term "Caller's Phone Number" refers to the telephone number utilized by a Caller to place a Voice-Phone-Call to the Called Number.

Consent: As used in the Patent Application, the term "Consent" (or "consent") refers to the act of a Caller providing permission through the IVR system to be sent a Text Message. Decisions concerning the extent and type of Consent(s) and the way such Consent is obtained from a Caller, whether in writing or through the IVR, or otherwise, is to be decided by any person or business using the Patent Applicant's System. Patent Applicant does not provide advice to anyone concerning the appropriate method or type of Consent, if any, required prior to using the Patent Applicant's System in automatically sending a Text Message to each Caller's Phone Number.

IVR: As used in the Patent Application, the term "IVR" is an abbreviation for "Interactive Voice Response" and refers to a technology that allows a computer to interact with humans through the use of voice and DTMF tones (dual tone multi frequency) input via telephone's touch keys. In telecommunications, IVR allows a Caller to interact with a Telephone Company system via a telephone keypad or by speech recognition. The IVR system, as referenced in the attached Patent Application, is provided by the Telephone Company, Amazon Connect. The attached embodiment and embodiment variations referencing a Caller deciding Voice-Phone-Call routing is describing the Telephone Company's IVR system enabling Caller communication and choice through voice or DTMF.

Lambda Function: As used in this Patent Application, the term "Lambda Function" refers to a serverless application framework provided by the selected Telephone Company, Amazon Connect. Although Amazon Connect is currently selected by Patent Applicant for demonstration purposes in the Embodiment example, Amazon Connect and its Lambda Function may not be used in alternative implementations of Patent Applicant's System. As used in this Patent Application, the Patent Applicant's System executes within the Lambda Function certain Patent Applicant's programming based upon data received through the Phone Company APIs.

Library: As used in this Patent Application, the term "Library" (or "library") refers to a collection of the following types of items currently saved by Patent Applicant on a Godaddy.com C-panel server and accessible through Patent Applicant's System in executing its functions: pre-written Text Messages in SMS, MMS (and coming soon in RCS formats); pre-recorded audio messages, artwork typically in .png (portable network graphics) or .jpg (joint photographic group) format to be included in Text Messages automatically sent. The Library can be supplemented with a variety of any audio or visual or clickable content a Called Party wishes to use in connection with the Patent Applicant's System.

Patent Applicant's System: As used in this Patent Application, the term "Patent Application's System" (or "patent applicant's system") refers to the creative idea and associated programming and system provisioning and integration resulting in the subject matter underlying this Patent Application.

Telephone Company: Outside of these embodiments, this term can often refer to a company providing services for both Voice-Phone-Call and text messages communications. However, these two communication methods need not be provided by the same company. Therefore, as used in this Patent Application, this term "Telephone Company" (or "telephone company" or "phone company") refers to the company providing the inbound and outbound Voice-Phone-Call communication services (not text message services) for the Called Number. The Telephone Company also enables Voice-Phone-Call routing of inbound telephone calls through the Auto-Attendant and IVR systems. The Patent Application embodiment and embodiment variations refer to Amazon Connect, for now, when referring to the Telephone Company. Patent Applicant's System need not be operated only with Amazon Connect in the role of Telephone Company because Amazon Connect can be replaced with another telephone voice service company offering adequate API interaction with Patent Applicant's System.

Texting Company: As used in this Patent Application, the term "Texting Company" (or "texting company" or "text company") is the text messaging provider for the Called Number. The Texting Company currently selected by Patent Applicant for use in the attached embodiment and embodiment variations is ZipWhip, Inc. (a/k/a ZipWhip.com or ZipWhip herein). This Texting Company has already agreed to enable the Called Number with SMS, MMS and RCS (RCS coming soon) text messaging service. The Patent Application embodiment and embodiment variations refer to ZipWhip, for now, when referring to the Texting Company. Patent Applicant's System need not be operated only with ZipWhip in the role of Texting Company because ZipWhip can be replaced with another text messaging company offering adequate API interaction with Patent Applicant's System.

Text Message: As used in this Patent Application, the terms "Text" and "Message" and "Text Message" and "Text Messages" and "text message" are used interchangeably to refer to an electronic and non-verbal communication between a Caller's Phone Number and a Called Number. As used herein, a Text Message could be transmitted in different service formats, including, SMS, and MMS (and RCS coming soon). SMS is an abbreviation for short message service. MMS is an abbreviation for multimedia message service. RCS is an abbreviation for rich communication service. These three services each offer different message content with RCS, the newest offering, deemed the next generation of text messaging. Not all Caller's phones are yet capable of RCS Message receipt. However, the Patent Applicant's System will provide automatic RCS Text Messages to Caller's Phone Numbers as they are enabled to receive such Text Messages.

Text Thread: As used in this Patent Application, the terms "Text Thread" (or "text thread") and "Message Thread" each refer to Text Messages chronologically identified and including unilaterally or bilaterally exchanged Text Message(s) between the Called Number and/or a Caller's Phone Number.

Voice-Phone-Call: As used in this Patent Application, the terms "Voice-Phone-Call" (or "voice phone call" or "phone call" or "voice telephone call" or "telephone call") refers to a telephone call consisting of voice communication only. A Voice-Phone-Call is initiated by a Caller and viewed by a Called Party as an inbound communication directed towards the Called Number.

The instant invention supplements the content of an ongoing Voice-Phone-Call with text message content sent to the Caller's Phone Number during an ongoing Voice-Phone-Call. A system and method of automatically sending text message (SMS, MMS, RCS services) to the telephone number (caller's phone number) utilized by a person who places a Voice-Phone-Call (caller) to the telephone number (called cumber) of another person or business (called party). The text message automatic occurs during an ongoing Voice-Phone-Call and identifies the called number as the source of the text message automatically sent, and contains text message content relevant to the purpose of the underlying Voice-Phone-Call. This enables a caller to reference relevant text message content during an ongoing Voice-Phone-Call with called party. The bi-lateral Text Thread created by the instant invention survives termination of the underlying Voice-Phone-Call and is a 24/7 direct method of communicating between businesses and customers, and vice versa, and between any parties to Voice-Phone-Calls without anyone entering a telephone phone number into a texting message system.

The instant invention automatically combines two communication methods (Voice-Phone-Call & Text Message service) to improve interaction between a caller and called party without action by a called party's associate answering an inbound Voice-Phone-Call. This enables called party's management to know a text message is automatically sent to a caller with appropriate text message content pre-written by management.

The applicability of this invention is not limited to a user utilizing any one Telephone Company or Texting Company. This invention functions to automatically send text messages through a selected texting company when a telephone call is received by an unrelated telephone company selected by the called party's management. The instant invention allows the called party to substitute as desired either or both telephone company and texting company for different service providing companies with technologically compatible systems. The instant invention can be applied to Voice-Phone-Call service for local area code phone numbers and toll-free numbers and functionality is not limited to the Voice-Phone-Calls or phone companies or texting companies inside the United States.

The instant invention provides certain tools enabling a called party to obtain consent, if appropriate as determined by the system user, prior to automatically sending text message to a caller's phone number. This invention sends a text message to a caller's phone number after an inbound Voice-Phone-Call is received. Therefore, this invention is not designed to distribute "spam" text messages to persons who did not first initiate a Voice-Phone-Call to the called party or called number.

"Automatically" refers to the system performing this task without an individual person needing to employ the use of a texting system at the time of each telephone call received. "Automatically" does not mean the user of this system cannot allow the process of callers opting-in or opting-out of receiving text messages. The system can be implemented to allow the caller to opt-in or opt-out of text messages before received and the system also allows the caller to opt-out of text messages after the first is received.

The problems that the present invention solve are the:
1. Inability to share non-verbal communications through a voice phone call alone. Inability to supplement verbal phone conversations (voice-phone-call conversation) with data or documents or other exhibits being discussed during the voice-phone-call conversation.
2. Inability to initiate a text message conversation between parties without manually entering a telephone number into a texting system.
3. Inability for automatically sent text messages to contain content relevant to the purpose of the underlying voice phone call. The purpose of the voice phone call may be determined by the subject matter (based upon voice phone call routing elected by the Caller) or by other factors with data provided by third parties, but with text message content always selected in advance by management.
4. Inability to solve Problems 1, 2, and 3, above, while the Caller who placed the voice phone call is still on the phone call.
5. Inability of business to follow-up with current or potential customers because the business does not know why a person called the business.
6. Inability of a business to remain relevant in the mind of a customer. The loss of future business between a business and current customer; and
7. Enabling businesses and customers to communicate back and forth in text at any time of the day and have such messages recorded to the business record for each customer.
8. Inability to solve Problems 1,2,37, above, automatically without a person having to type a caller's telephone number into a text messaging system.
9. Inability of text messages to be automatically sent by a texting company when the inbound voice phone call is received by an unrelated telephone company.
10. Inability of text messages automatically sent to caller phone numbers be sent in different text formats including SMS, MMS and RCS messaging.

The present invention is able to:
1. Enable a texting company to automatically send a text message to a caller's phone number after the inbound phone call is received by a telephone company unrelated to the texting company, and
2. While the caller (on the calling phone) is still on the line, and
3. With content in the auto text message selected from pre-written selected messages and sent based upon the reason for the caller's voice phone call.
4. Enable text messages automatically sent to every caller who places a telephone call to a user of this submitted system (without regard for the purpose of the voice phone call itself). The present invention could send the same message to every caller or the system could select different automatic text messages to send out to callers based on a variety of factors it can take from Telephone Company API data (such as time of call, night time caller receives a different Text Message, etc.), or from outside data providers (when implemented as desired) temperature outside, caller geographic location, etc.
5. Items 1, 2 should be able to work with item 4 or separately.
6. Items 1, 2 and 3 happen automatically and without any company employee having to type a Caller's telephone number into a text message system.
7. Eliminate any determination from the person answering an inbound voice phone call as to whether a text message should be sent to a Caller.
8. Eliminate any determination from the person answering an inbound voice phone call as to the content of the text message automatically sent.
9. Enable the automatic sending of a text message to a caller when the inbound voice phone call is answered by an Auto-Attendant.
10. Eliminate the problem of not being able to automatically send a text message in response to an incoming voice phone call when the battery on a cell phone is without energy to power the cell phone.
11. Enable the automatic text message response function to be provided by one company while the voice phone call services are provided by a different company.
12. Automatically send an initial text message only after a Caller places a voice telephone call to a Called Number used by a company.

The automatic text message system of the present invention supplements voice phone call conversations. For example, a "new" customer for a business would, while still on the telephone call, automatically receive a text message with content relevant to the purpose of a "new" customer's phone call. Since the "new" customer receives the text message while on the phone call with the business representative, the business representative can ask or direct the caller to reference text content, already on the caller's cell phone, while verbally discussing the same matter during the voice phone call. This improves communications by combining voice phone calls with everything a text message can simultaneously deliver.

The content contained in the automatic text message is completely customizable for any foreseeable calling person's purpose. The business operator can draft custom content text messages to be automatically sent to caller for any purpose including, but not limited to: new customers, current customers, job applicants, callers at any specified time or day of the year, callers seeking driving directions or business hours, or business employees or any business-related or trade person calling. There can be a text message written for any purpose for any person calling the business.

A business no longer needs to instruct an employee to enter a telephone number into a texting system. A business no longer needs to wonder if the employee entered each caller's phone number into a texting system to enable text messaging. This now all happens automatically to improve business-customer communications while eliminating associated employee errors and costs.

After receiving a phone call, a business can then reference its sent text records to see when and why (the purpose for which) each person called the business. The business could compare the data of texts sent against sales records and scheduled appointment records to know if the telephone call from each person resulted in a scheduled appointment or sale. If neither of these two events, or if no other desired phone call transaction conversion happened, the business is now able to follow-up with the caller using the text thread automatically and already created with the phone in that caller's pocket. The content on each follow-up communication can be written with content as desired by the business. Records of communications made to each caller, and vice versa, are saved in the texting system and can be utilized for numerous business and marketing and statistical purposes.

The texting system of the present invention could also be used to send appointment reminders to current customers for any business purpose including, but not limited to: bring in caller's car for service, or bring caller to dentist for a periodic cleaning, or a reminder to sign documents or anything else wanted. These reminders along with social reminders such as birthday/holiday greetings, weather/sport scores updates, product/service updates, etc., will all assist the business is staying relevant in each caller/customer mind to prevent losing future business with these customers.

An automatic text message thread between a business and a customer, and vice versa, should provide a strong marketing and operational competitive strategy advantage to businesses that use this system while their competitors do not.

Referring now to FIG. 1, the system and method for automatic text messaging comprises the steps of a person (the "calling party") placing a telephone call from his or her telephone number (the "calling number") to a telephone number (the "called number") used by another person or business. Much like millions of other phone numbers used in the USA, the called number is set up for voice communications with a traditional landline or VOIP (voice over internet protocol) telephone company (telephone companies generally referred to herein as "phone company"). A business utilizing this texting system will request the phone company release to another company all texting services associated with the called number. Therefore, the texting functions (sending and receiving texts) associated with the called number are set up to function independently through another company providing texting service (texting services companies generally referred to herein as "texting company") and not through the same telephone company providing the voice communication service.

Operationally, and to the perspective of the calling party, the phone call placed by the calling party to the called number works essentially like most other phone system insofar as the call will be answered by a live operator or by an auto attendant system providing options for call routing based upon the calling party's call purpose (purpose can be determined by the subject matter of the call or other factors such as the time of day the phone call is received). Subject based call routing options within an auto attendant system could be selected by the calling party selecting a telephone key (for example, auto attendant voice saying "New Customers, please press 1") for each option or by voice recognition selection. In the case of a live operator answering the telephone call, the live operator would route the call to the appropriate phone system line extension desired. Alternatively, the live operator or after-hours system answering the phone call could be the destination in satisfying the purpose of the calling party's phone call.

In this example of the preferred embodiment, and for purposes of demonstrating system functionality, the phone company for voice communications services has been set-up to be provided by Amazon Connect while the texting company services are set-up and provided by ZipWhip. Amazon Connect could be replaced by another phone company voice services provider with suitable webhook/API capabilities ("API" refers to Application Programming Interface). ZipWhip could be replaced by another texting company provider with suitable webhook/API capabilities.

In this example of the preferred embodiment, the system is designed to do the following when the called number receives a telephone call from the calling party:

1. The telephone call placed to the called number is answered by an auto attendant phone system at the phone company. The auto attendant will play a pre-recorded audio message and provide the calling party with call routing options based on the expected purposes of the calling party's phone call.

An alternative (1.1) not used in this example is a live operator person answering the telephone call (instead of an auto attendant) on behalf of the called number's owner/user and directs the calling party's call to the desired person or department. This alternative 1.1 also includes a possibility the live operator person answering the calling party's phone call is the routing destination sought to complete the purpose of the phone call. In any of these scenarios, the calling party's phone call is routed to the appropriate destination based upon the calling party's purpose (purpose could relate to a specific subject or time or date of the telephone call) for the call; and 2. While the calling party is still on the phone call, the calling number will automatically receive a text message (SMS or MMS or RCS messaging format) appearing to originate from the called number.

Called numbers have voice communications handled by the phone company (this example using Amazon Connect) while the texting functions are handled by the texting company (this example using ZipWhip). A hypothetical example is calling party uses a hypothetical calling number (777) 777-7777 and places a phone call to a hypothetical called number (888) 888-8888. While the calling party's phone call is still connected to the called number, the calling number (777) 777-7777 will automatically receive a text message from (888) 888-8888 while the calling party is still connected to the phone call; and 3. The automatically sent text message will contain text message content sent from the texting company identifying the sender as the called number and sent to the calling number based on the purpose of the calling party's phone call.

This means, hypothetically, that a "new customer" caller would automatically receive, while on the phone call, a text message with content predetermined by the called number owner/user to address the needs of the calling party. The automatically text message content is fully customizable to address the purpose of any telephone call including, but not limited to the following: new customers caller, current customer caller, job applicant caller, any department of a business including accounts payable or receivable caller, caller seeking general business information including operating hours or driving directions, caller desiring scheduling appointments or services, caller seeking to view services or products for sale or lease, caller wanting to make a payment, caller wanting to view or sign documents, etc.

So, the example of the preferred embodiment currently utilizes a called number (702) 999-9999 (subject to change to any called number selected) with the calling number automatically receiving a text message depending on the option 1 or 2 or 3 presently offered by the auto attendant: New customers press 1, current customers press 2, and press 3 if you are interested in learning more about using this phone system. The content of each corresponding text message is currently set to demonstrate the system's ability to automatically sent text messages with content determined by the caller's purpose & routing of the phone call. In actual use, the text message sent for any caller's phone call purpose will provide text content designed to satisfy the purpose of each such phone call purpose.

Application Development

Solutions are based on custom-developed applications. Currently, there are two applications designed and used by the present invention.

The First application has been developed specifically in this example to utilize the webhooks/API capabilities of the Amazon Connect phone company. The application utilizes available API and is stored on a third party or on an application-user's web server (can be selected by called number user/owner) to handle incoming phone call actions. Through the application, each of the following items are passed through a webhook through the application: (1) calling number's phone number, and (2) the Amazon Connect account information, and (3) the phone call purpose-based call routing option selected. The application provides the initial pre-recorded audio response heard by the calling party and drives the custom purpose-based text message content to the calling number phone. The application can achieve greater flexibility and scalability depending on the level of API capabilities of the selected phone company hosting a called number.

The second application has been developed using the texting company ZipWhip available APIs and this application, like the first application discussed above, is stored in a public directory on the patent applicant's web server to handle and facilitate the automatically sent outgoing text messages. The applications need not be stored in a server owned or managed by the patent applicant so long as the server can provide services needed to accommodate the applications' needs. The outgoing text message content has been stored on the patent applicant's public web server. Each outgoing text message is saved separately, and these outgoing text messages can be modified individually to contain the message desired to be sent for each phone call purpose. The second application selects the appropriate pre-written text message from the server to be automatically sent to the calling number during the phone call. The second application then passes the selected outgoing text message and forwards the text message to the calling number (obtained through the first application from Amazon Connect webhook/API). Operationally, the second application sends the pre-determined content of the selected text message along with the calling number to ZipWhip through its (ZipWhip's) API capabilities to generate and send the text message to the calling number with information provided by the second application.

Custom text content, custom initial audio messages and phone call routing extensions are stored in a settings file to allow for custom responses based on selected option. A user of this system can adjust text messaging and audio message via an FTP (file transfer protocol) account. Files can be uploaded as appropriate.

A texting Company, currently ZipWhip for this demonstration, can be enabled to integrate the text messages sent to callers with virtually any sort of customer or sales or call tracking or appointment scheduling or other system. This system does not, to the applicant's knowledge, limit the ability of other applications to be used in texting communications. This system simply expands the availability of text messaging between parties without anyone having to enter a person's name or telephone number or email address into a texting system to initiate the text messaging.

Assumptions

Active phone number (702) 999-9999 was set up with a telephone company to provide voice phone call services. In this test case, the telephone company is Amazon Connect, but can be substituted by an alternate telephone company with adequate public webhook/API ability.

Active phone number (702) 999-9999 was set up with ZipWhip, a texting company retained to provide text message services. Texting company, ZipWhip, can be substituted by an alternate texting company with adequate public webhook/API ability.

Application(s) are stored on a public web server. This solution is based on patent applicant's custom-developed application. Application functionality also assumes, for now, the calling number is not blocked to prevent its phone number from showing to a telephone company providing voice phone call services for the called number, (702) 999-9999.

The instant system can also send text messages from one texting company when a voice phone call is received by an unrelated telephone company. There is a text record of every text sent to each person and every text message received from each customer. These could be saved in the company file. The phone numbers in each text could also be compared by the company against sales and appointment scheduling records to know when to follow-up with the called. This is especially true because the company knows the purpose of the phone call and knows the message to use when following up.

FIG. 1, the preferred embodiment of the instant invention, sets forth a block diagram demonstrating a use of the preferred embodiment in response to an incoming Voice-Phone-Call along with blocks diagraming entities and systems involved in this usage. This demonstrates use of the invention to automatically send an SMS or MMS format (with RCS message format arriving shortly) text message from a texting company and to a caller's phone number during the on-going Voice-Phone-Call between the caller and called party. It illustrates the method in which the instant invention's system, in coordination with the telephone company IVR, enables the text message content to be supplemental to the purpose of the underlying Voice-Phone-Call as dictated by the caller. The block diagram demonstrates instant invention's system functioning after the inbound Voice-Phone-Call is screened and then answered by an Auto-Attendant system provided by the telephone company (Amazon Connect). It concludes with the instant invention's system combining the active Voice-Phone-Call communication with text message communication from two different companies during the same conversation.

Further referring to FIG. 1, box [1.1] represents a caller that uses a device with Voice-Phone-Call service provided by a telephone company and enters a called number to initiate a telephone call with called party. The called number in the preferred embodiment 1 is (702) 999-9999. Therefore, the caller entered (702) 999-9999 to begin a Voice-Phone-Call call with the called party. As part of setting up the instant invention's system, the called number's capabilities (Voice-Phone-Call and text messaging) are separated to be provided by two different companies (See FIG. 8-Diagram 1: Called Number Communication Capabilities). Implementation of the preferred embodiment involves the instant invention retaining a telephone company (ie, Amazon Connect) to provide direct-in-dial (DID) Voice-Phone-Call services with a texting company (ie., ZipWhip) providing Text Message services. The attached "Called Number Communication Capabilities" illustrates the distribution of voice and texting services amongst two different companies. The instant invention makes use of the Auto-Attendant and IVR and API services at the telephone company in enabling the instant invention's system. Box [1.2] represents the Voice- Phone-Call initiated by the caller in [1.1] being routed through the public switched telephone network (PSTN) and routed to the telephone company (ie., Amazon Connect's VoIP gateway). The telephone company recognizes the called number is association with inbound Voice-Phone-Call instructions enabled inside of the instant invention's (called party's) account at the telephone company. The telephone company then routes the Voice-Phone-Call internally as pre-configured by the called party and makes data inflow and outflow possible through the telephone company's API. Box [1.3] represents the caller's phone number being received by the telephone company network switch as part of the Voice-Phone-Call connection process. The telephone company (Amazon Connect) stores this information for availability to multiple systems, including instant invention's system, during the Voice-Phone-Call. The telephone company's API (through its contact attributes API) provides the caller's phone number to the system of the instant invention. Box [1.4] represents the Voice-Phone-Call progressing to executing a program (Lambda Function) seeking to match the caller's phone number against a blocked caller list created and supplemented by the called party. More technically described, the Lambda Function program executes the instant invention's programmed JavaScript code associated with matching the caller's phone number against the blocked caller list (currently located within DynamoDB at the telephone company). The caller's phone number is provided by the telephone company as an input to this program and used in a standardized E.164 format (an internationally used telephone number format method by which the instant invention's system is able to use to match domestic and international caller phone numbers against the blocked caller list. The result of the query is examined by the instant invention's system to determine whether a record inside the blocked caller list was found matching the Caller's Phone Number. Box [1.5] references that if the instant invention's system locates the caller's Phone number on the blocked caller list the Voice-Phone-Call is disconnected. Box [1.6] represents that if the instant invention's system does not identify the caller's phone number on the blocked caller list, the Voice-Phone-Call continues to the next step in the process, as predetermined by the configuration of the called party's phone system (see [1.7]). Box [1.7] follows [1.6], the Auto-Attendant answers the inbound Voice-Phone-Call and plays a pre-recorded audio message for the caller to hear. The audio message presents the caller with Voice-Phone-Call routing options selectable by caller through the IVR system. Box [1.8] represents wherein the pre-recorded audio message referenced in [1.7] presents the caller with three Voice-Phone-Call routing options from which caller may make a selection through the IVR system based upon the purpose of caller's Voice-Phone-Call. The caller hears "new customers—please press 1" and "current customers—please press 2" and there is an option 3 for callers interested in learning about using Patent Applicant's System. The caller selects the desired Voice-Phone-Call routing, whether 1 or 2 or 3, by using the numbered keys on the caller's telephone. Once a routing option is selected, the instant invention's system detects the Voice-Phone-Call routing option through the telephone company's API. The telephone company's Auto-Attendant also receives the Voice-Phone-Call routing selected. This preferred embodiment lists three routing options for demonstration purposes, but the instant invention's system could be configured with literally dozens of routing options. Also, this preferred embodiment enables the caller to select the routing option 1 or 2 or 3 through the IVR system. In other examples, the IVR system could be configured to allow routing options through caller's voice directions recognized through the IVR. Alternatively, the preferred embodiment could be reconfigured to be answered by a live person receptionist instead of being answered by an Auto-Attendant. The live person receptionist could then enter the routing option selected by the caller into the telephone company system.) Box [1.9] represents wherein the Auto-Attendant receives the caller's Voice-Phone-Call routing selection and thereby begins to transfer the Voice-Phone-Call to the phone system extension pre-determined by called number's management to correspond with the option selected by the caller. Box [1.10] represent wherein the instant invention's system detects, through the telephone company API system, the Voice-Phone-Call routing selected by the caller. Box [1.11] represents wherein the instant invention's system executed its programming to select the pre-written text message supplementing the purpose and routing selected by caller for the underlying caller's Voice-Phone-Call. In this preferred embodiment, the selection of the text message content is limited to content corresponding with the Voice-Phone-Call routing selected by the caller. The instant invention's system accesses the pre-written text messages in a library database (currently stored within the Amazon web services server storage). For purposes of this box [1.11] the text message is supplemented by artwork in the form of an image in PNG or JPEG format. The selected artwork piece is included with the instructions sent to the texting company. This preferred embodiment specifically provides text message content based upon the purpose of the underlying Voice-Phone-Call as selected by the caller. Other embodiments could alternatively select the content of the text message by other factors not directly, like Voice-Phone-Call routing, selected by the caller. Alternative embodiments show text message content selected by factors including the time of day or the date of the Voice-Phone-Call. The text message content can be correlated with nearly any other external data available to the instant invention's system including outdoor temperature or the geographic location of the caller's telephone (provided to the instant invention's system by external data source), or data from other systems utilized by a called number's business management. Box [1.12] represents wherein after selecting the correct text message content (and artwork) from the library of pre-written text messages, the instant invention's system transmits to the text company API system the text message content (including artwork) along with an instruction for sending the text message to the caller's phone number. Box [1.13] represents wherein the texting company, through its API system, receives the text message and instructions from the instant invention's system and immediately sends the text message to the caller's phone number. The text message to the caller's phone number appears to the caller as though the text message is sent directly by the called number. Therefore, due to the speed in which the instant invention's system functions as an intermediary between telephone company API and texting company API, the caller is receiving the text message while the caller is still an active voice phone call with a representative at the called number's business staff. The text message received by the caller's phone number is recognizable as the same called phone number dialed by the caller in this preferred embodiment Box [1.1], above. So the text message is received by the phone caller's number while the caller is still on the live Voice-Phone-Call and also contains text message content supplemental to the Voice-Phone-Call routing selection made by the caller. No person answering any inbound Voice-Phone-Call placed to the called number had any live control over whether or not a text message was sent or which text message content was sent. This is all automatically performed by the instant invention's system. Box [1.14] represents wherein the caller (caller's phone number) is now connected to the called party (called number) through two communications mediums through no effort of either party and during the live Voice-Phone-Call. The caller and the called party are connected by Voice-Phone-Call and by text message containing information supplemental to the underlying Voice-Phone-Call. The caller and called party are now free to exchange ideas and communications in a broader and more meaningful manner using voice and non-voice information exchanged through text message such as, but not limited to, website links, photographs, driving directions, appointment scheduling, link to payment portal, link to video conference, etc. The text thread automatically created by the instant invention's system will survive termination of the underlying Voice-Phone-Call and becomes a bilateral communication method for both parties in the present and in the future. Box [1.15] represents wherein the Auto-Attendant routes the Voice-Phone-Call to the destination selected by the caller.

Figure 2:
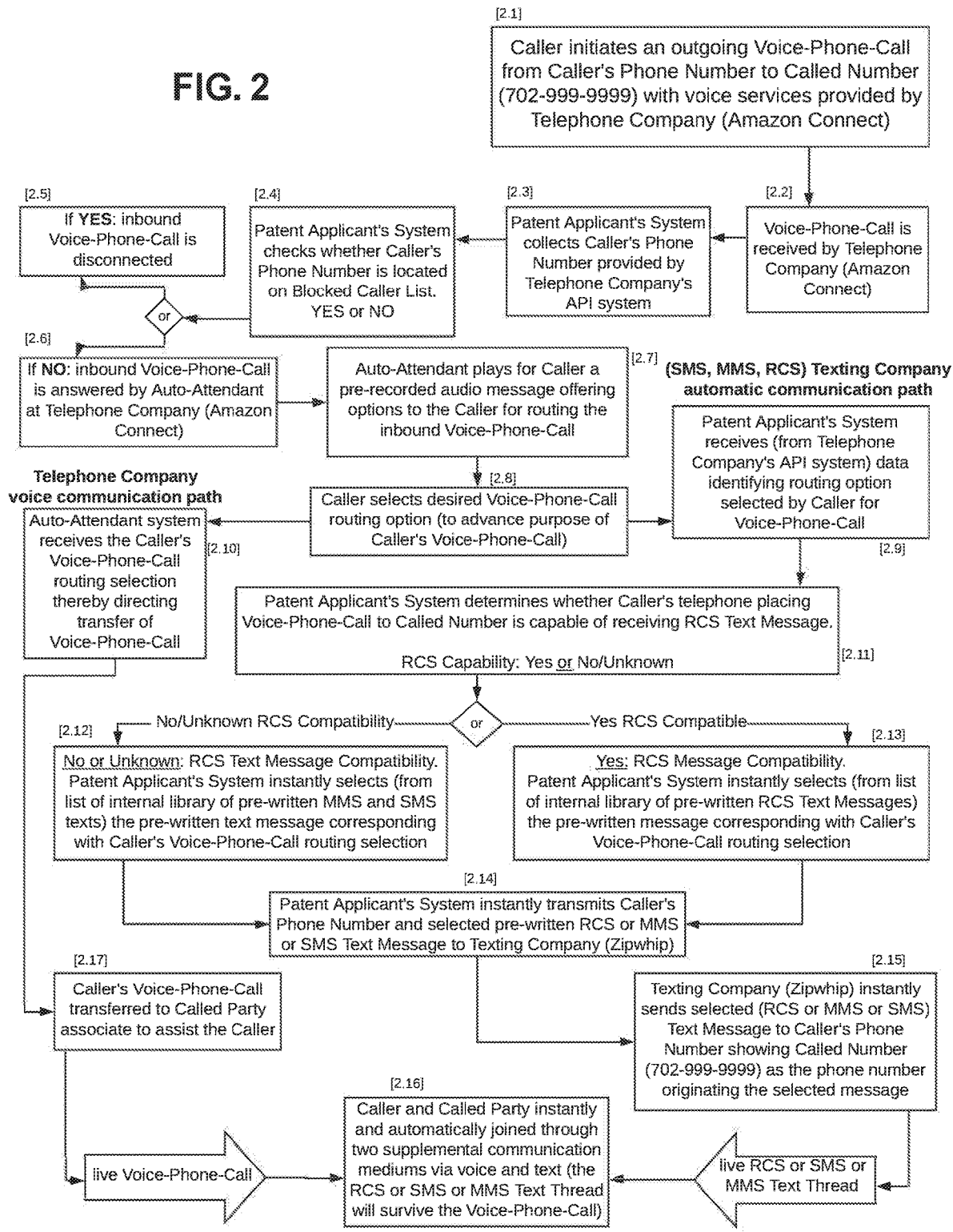
FIG. 2 shows a block diagram demonstrating a variation on the invention's use in response to an incoming Voice-Phone-Call along with blocks diagraming entities and systems involved in this usage.

FIG. 2, including blocks 2.1 through 2.17, shows a block diagram demonstrating variation #1 on the invention's use in response to an incoming Voice-Phone-Call along with blocks diagraming entities and systems involved in this usage. In addition to the demonstration blocks appearing in the Embodiment, this variation 1 demonstrates use of the invention to automatically send an SMS or MMS or RCS Text Message (RCS coming soon) from a texting company and to a caller's phone number during the on-going Voice-Phone-Call between the caller and called party. Blocks [2.9, 2.11, 2.12, 2.13, and 2.14] illustrate the method in which the patent applicant's system will determine which text message type is sent to each caller's phone number. This variation #1 utilizes an Auto-Attendant provided by the telephone company (ie., Amazon Connect) to answer the inbound Voice-Phone-Call with a text message sent through the selected texting company (ie., Zipwhip).

Figure 3:
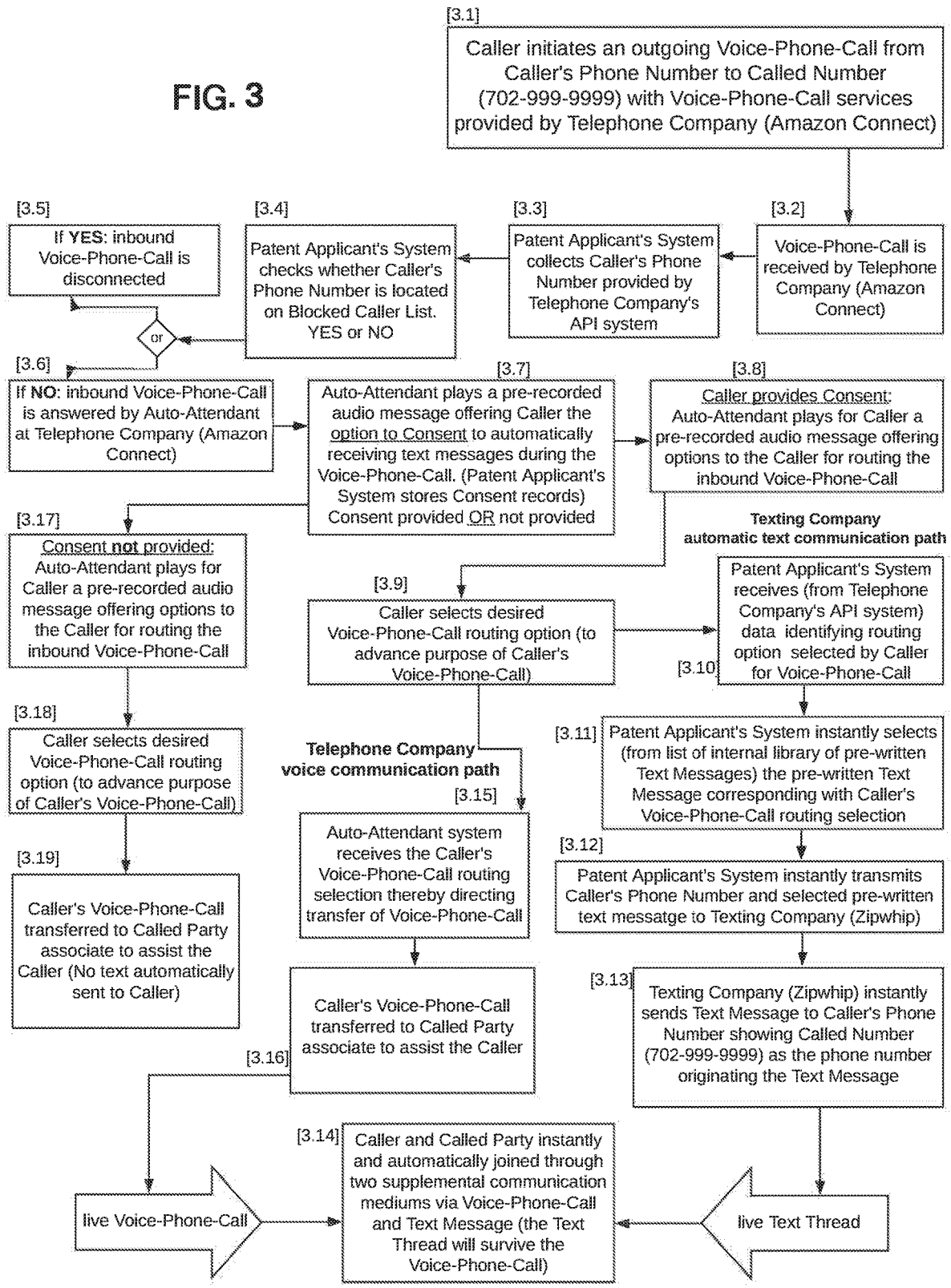
FIG. 3 shows a block diagram demonstrating another variation on the invention's use in response to an incoming Voice-Phone-Call along with blocks diagraming entities and systems involved in this usage.

FIG. 3, including blocks 3.1 through 3.19, shows a block diagram demonstrating variation #2 on the invention's use in response to an incoming Voice-Phone-Call along with blocks diagraming entities and systems involved in this usage. In addition to the demonstration blocks appearing in the Embodiment, this variation 2 demonstrates coordination amongst patent applicant's system and the Auto-Attendant to solicit consent from a caller prior to automatically sending a text message. Block [3.7] initiates a caller's choice option of whether to receive automatic text message after selecting Voice-Phone-Call routing. This variation #2 utilizes an Auto-Attendant provided by telephone company (ie., Amazon Connect) to answer the inbound Voice-Phone-Call with a text message sent through the selected texting company (ie., Zipwhip).

Figure 4:
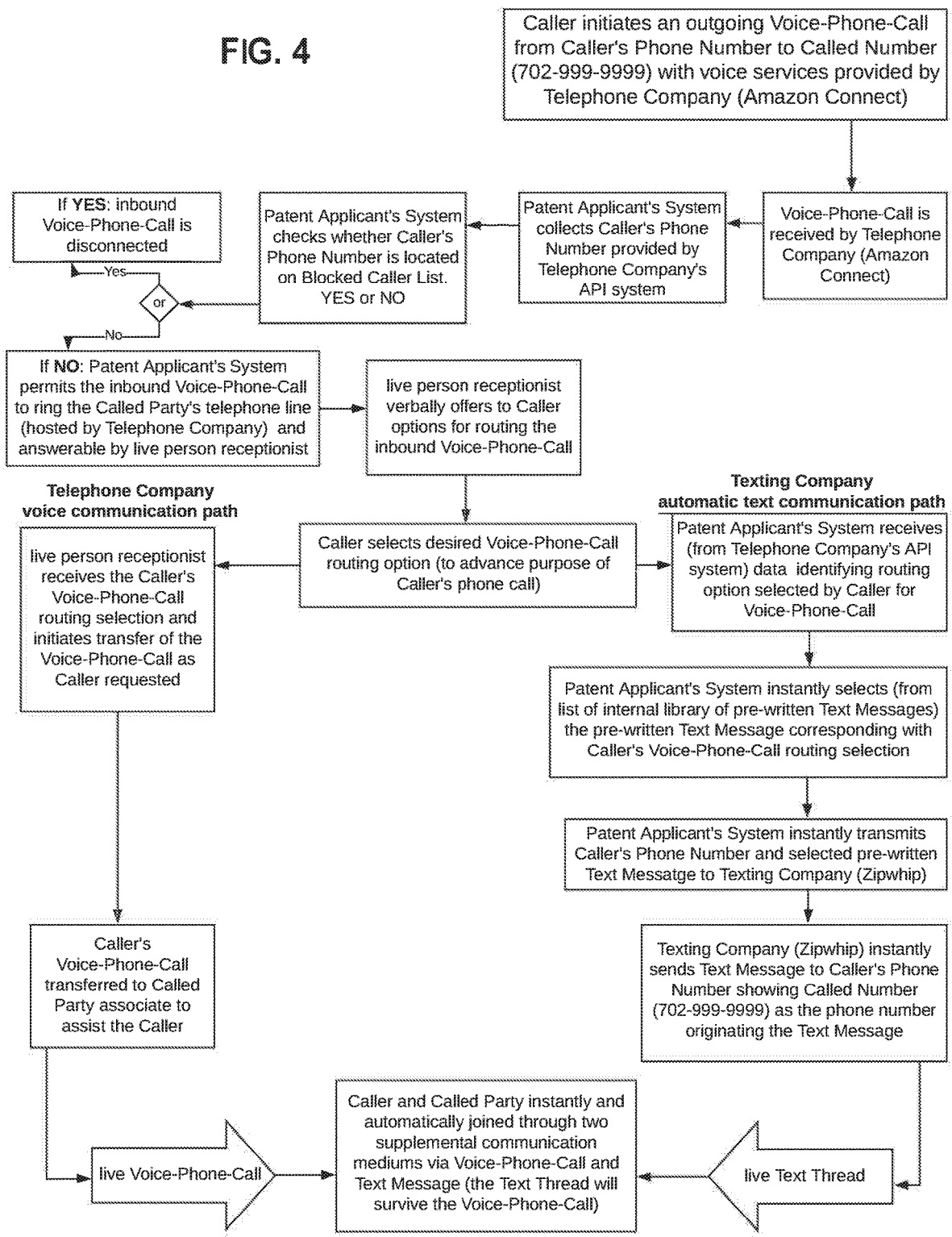
FIG. 4 shows a block diagram demonstrating another use of the invention in response to an incoming Voice-Phone-Call and a block diagram of entities and systems involved in this usage.

FIG. 4 shows a block diagram demonstrating variation #3 and another use of the invention in response to an incoming Voice-Phone-Call and a block diagram of entities and systems involved in this usage. Embodiment variation #3 is the same as the preferred embodiment with the exception that the inbound Voice-Phone-Call is answered by a live person receptionist instead of an Auto-Attendant. Voice-Phone-Call routing is elected by the caller in a verbal exchange with the live person receptionist instead of using an IVR system, as used in the preferred embodiment, to recognize the call routing selected by the caller.

Figure 5:
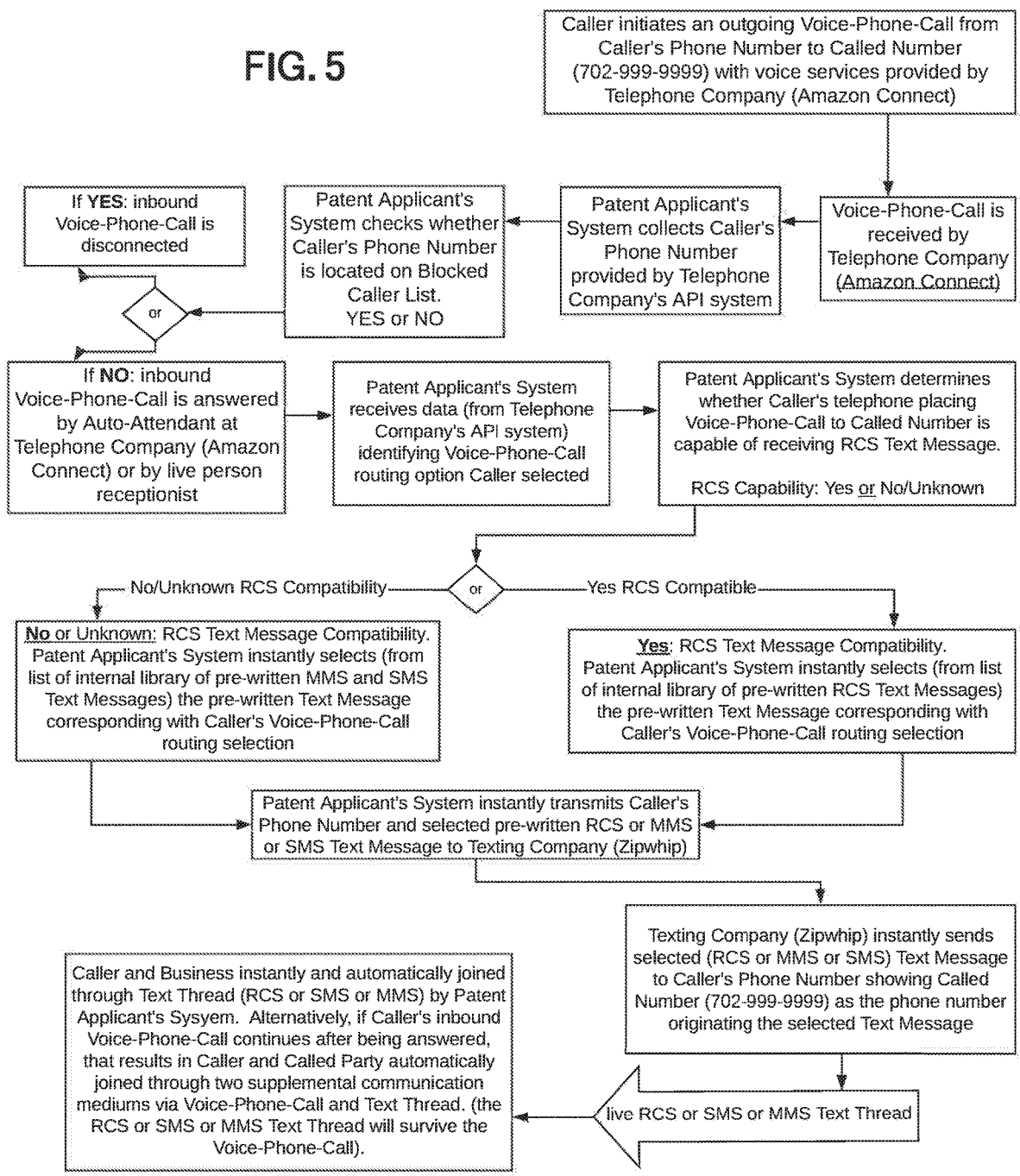
FIG. 5 shows a block diagram demonstrating another use of the invention in response to an incoming Voice-Phone-Call and a block diagram of entities and systems involved in this usage.

FIG. 5 shows a block diagram demonstrating variation #4 and another use of the invention in response to an incoming Voice-Phone-Call and a block diagram of entities and systems involved in this usage. Embodiment variation #4 is the same as the embodiment of variation #1 with the exception that text message is automatically sent to every caller phone number immediately upon the Auto-Attendant answering the inbound Voice-Phone-Call.

Figure 6:
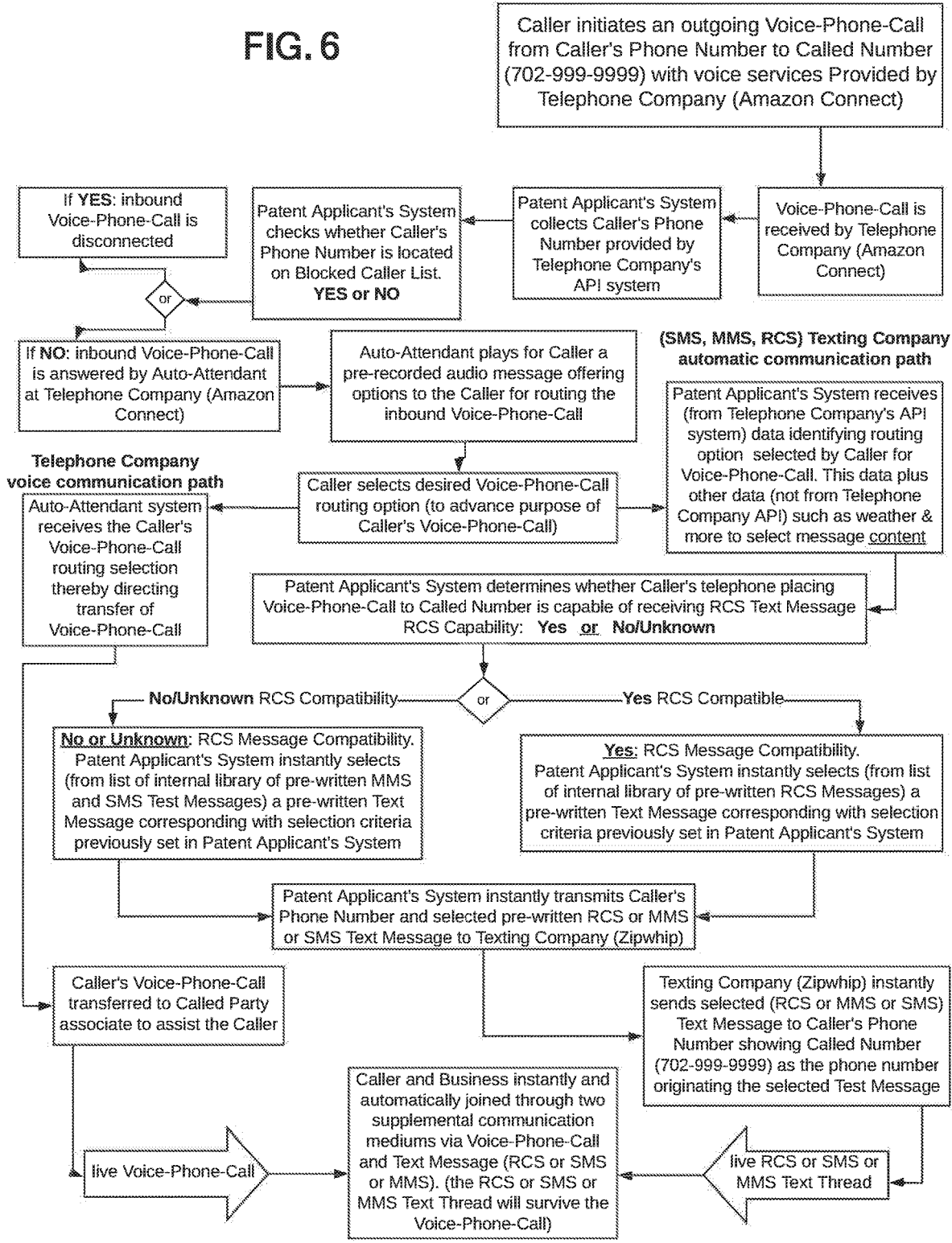
FIG. 6 shows a block diagram demonstrating another use of the invention in response to an incoming Voice-Phone-Call and a block diagram of entities and systems involved in this usage.

FIG. 6 shows a block diagram demonstrating variation #5 and another use of the invention in response to an incoming Voice-Phone-Call and a block diagram of entities and systems involved in this usage. Embodiment variation #5 is the same as the embodiment variation #1 with the exception that text message content is not selected based solely upon the Voice-Phone-Call routing selected by the caller. Instead, the text message content in this embodiment variation 5 is selected from the pre-written library based upon external factors including, but not limited to, telephone call or date or outside weather and more.

Figure 7:
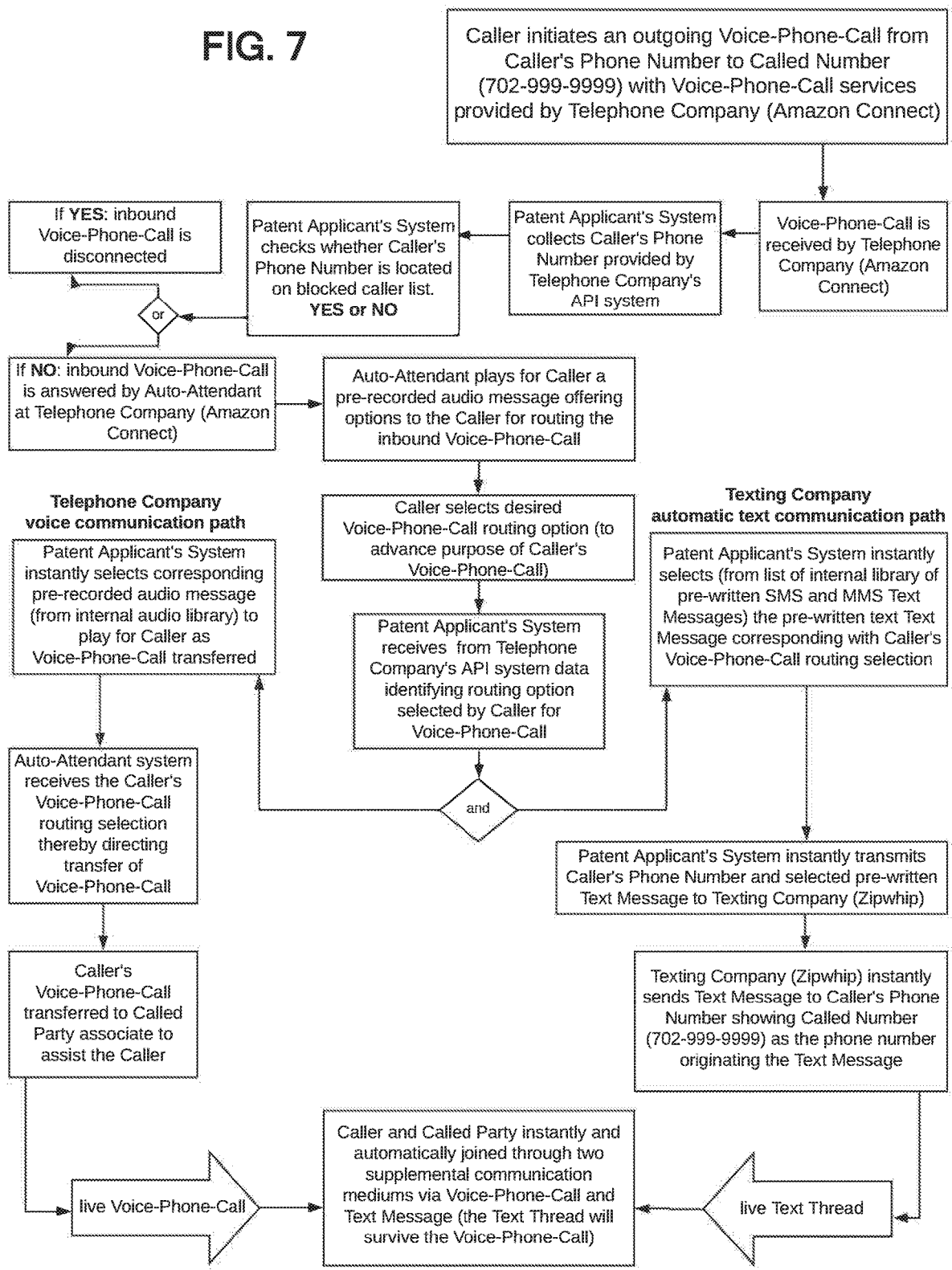
FIG. 7 shows a block diagram demonstrating another variation of the invention on the invention's use in response to an incoming Voice-Phone-Call along with blocks diagraming entities and systems involved in this usage.

FIG. 7 is a block diagram demonstrating variation #6 on the invention's use in response to an incoming Voice-Phone-Call along with blocks diagraming entities and systems involved in this usage. In addition to the demonstration blocks appearing in the embodiment, this variation #6 demonstrates the instant invention's system facilitating and organizing with the API system the play for the caller a pre-recorded audio message during the transfer of the Voice-Phone-Call.

Figure 8:
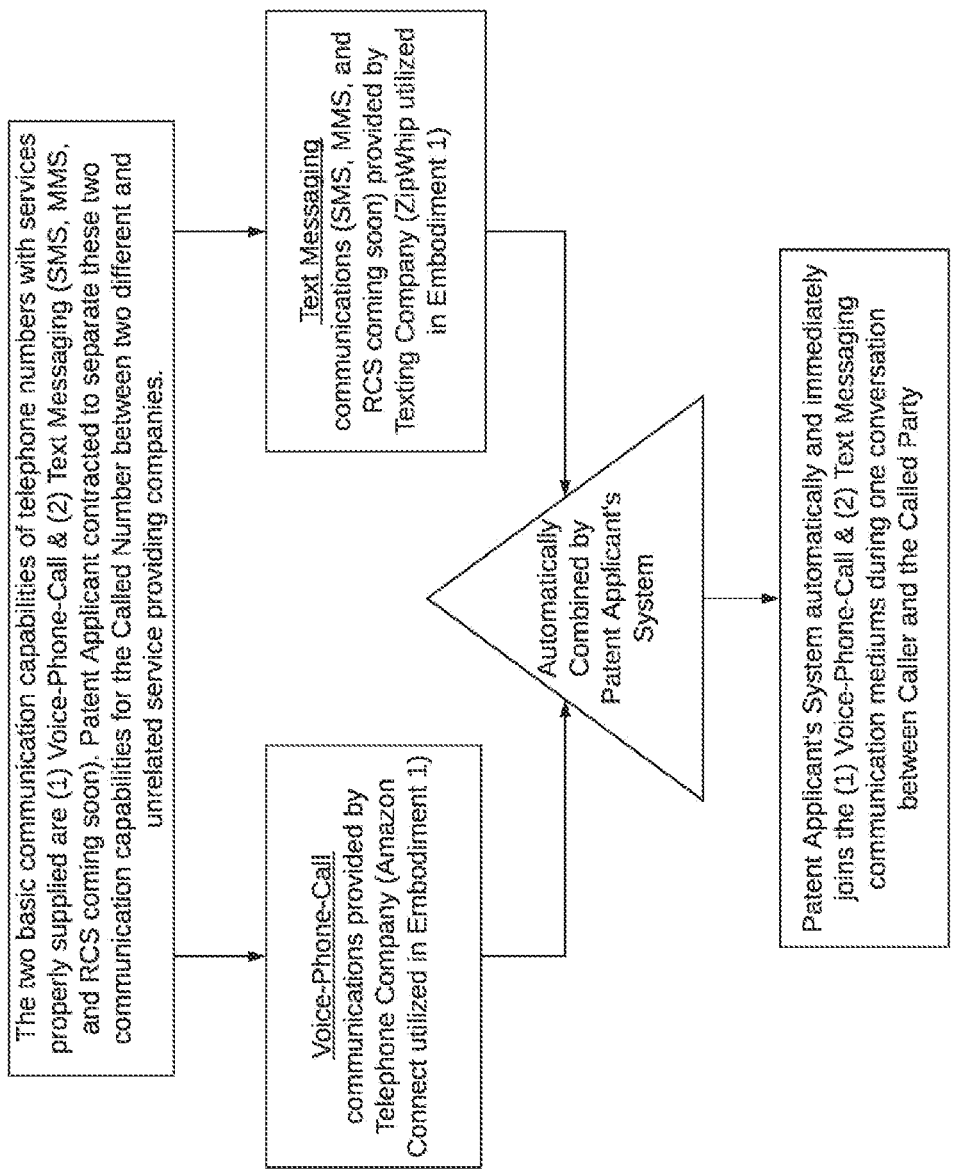
FIG. 8 shows a block diagram illustrating a called number can generally be utilized through service providers for Voice-Phone-Call and for text message communications.

FIG. 8 is a block diagram illustrating a called number can generally be utilized through service providers for Voice-Phone-Call and for text message communications. This diagram illustrates the patent applicant's intention to separate those two communication methods to two different companies. Voice-Phone-Call services for the called number were selected to be provided by telephone company (ie., Amazon Connect) while the text messaging services for the same called number are provided by texting company (ie., ZipWhip). The diagram 1 shows broadly the instant invention's system combining the active Voice-Phone-Call communication with a text message communication from two different companies during the same conversation. The called number communications are separated to two different companies and then automatically combined through instant invention's system into one live conversation.

Figure 9:
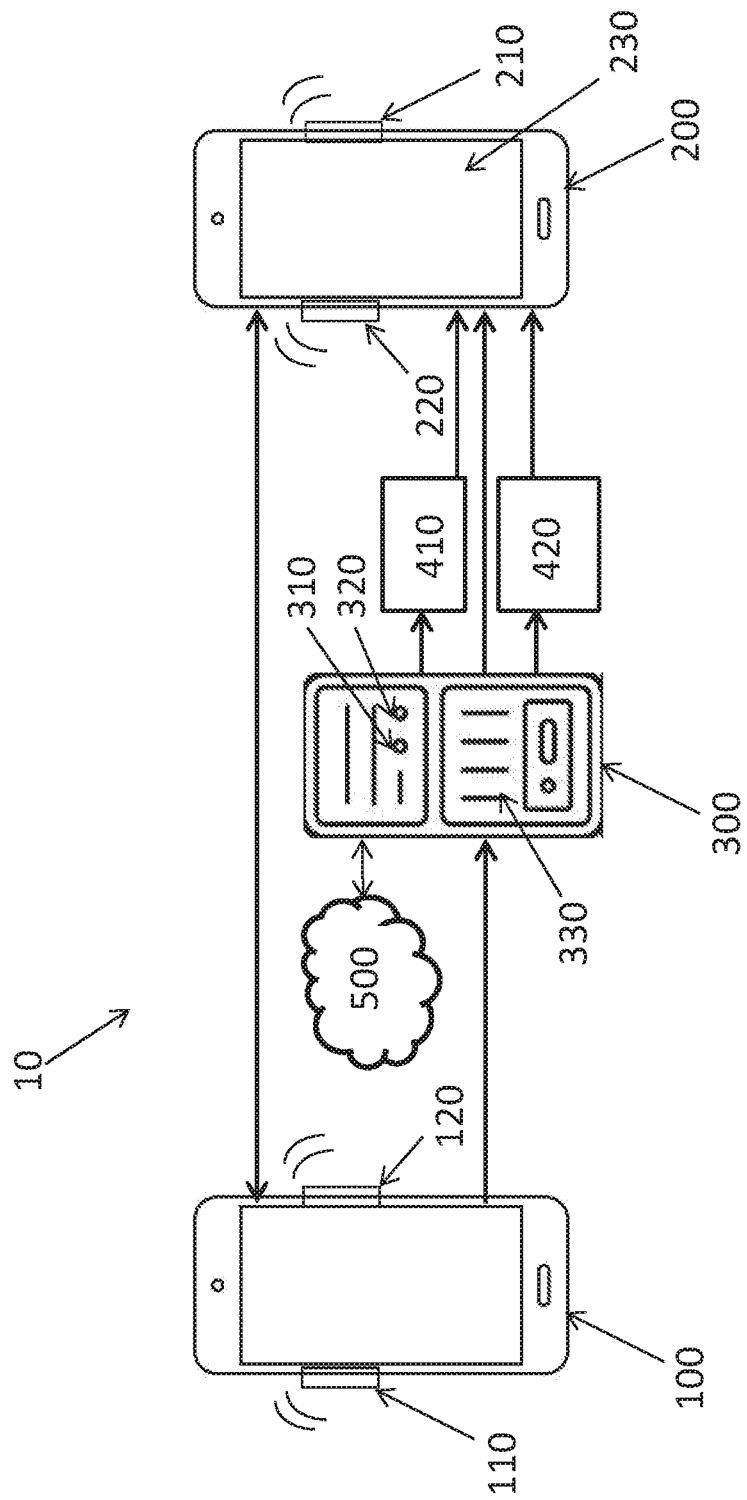
FIG. 9 illustrates two communication systems communicating and automatically text messaging using an internet server and a plurality of phone companies.

As for the subject matter being claimed herein in the broadest terms possible, and referring to FIG. 9, the applicant's instant invention of a method for automatic text messaging comprises the steps of providing a first communication system 100 including a receiver 110 and a transmitter 120; providing second communication system 200 including a receiver 210 and a transmitter 220, wherein the first and second communication systems are adapted to electronically communicate with one another; and providing an automatic communication system 300 including a receiver 310, a transmitter 320, and computer processing components 330, wherein the automatic communication system is adapted to be electronically connected between the first and second communication systems; and providing a computer application encoded within the computer processing components of the automatic communication system, wherein the computer application is adapted to monitor said communications between said first and second communication systems, and wherein the computer application performs the steps of receiving communications between the first and second communication systems; provides a menu of options to the second communication system to choose from; receives a response from the second communication system choosing an option; provides a predetermined response for each of the options; and depending on the responses by the second communication system, sends text messages to the second communication system. Furthermore, the second communication system initiates communication with the first communication system; the automatic communication system sends intermittent text messages to the second communication systems; and the automatic communication system is adapted to send text messages to the second communication system after the second communication system ends communications with the first communication system. The computer application may further perform the steps of saving a phone number associated with the second communication system and sending text messages to the second communication system at predetermined time intervals. The text messages may include periodic reminders that may include information based upon the verbal responses by the user of the second communication system. Furthermore, the computer application may include a step requesting consent from the second communication system prior to automatically sending text messages thereto, and provide an opt-out of text messages option which would allow the second communication system to opt-out of text messages after an initial text message is received.

The second communication system may include keypad 230, such that the user of the second communication system can respond and choose from the menu of options via said keypad. Furthermore, the response to the menu of options can be chosen by a user of the second communication system via voice commands.

The automatic communication system 10 may include a phone company 410 providing telephonic services, wherein the text messages are routed through the phone company. The telephonic services of the phone company may include providing voice mailboxes adapted to retain and deliver voice messages to the second communication system.

The computer application may also provide an autoattendant providing the menu of options in the form of audio verbiage, and include two phone companies providing telephonic services, such that a first of the two phone companies 410 is used for verbal communications and the second of the two phone companies 420 is used for text messaging. The verbal communications and the text messaging can then be combined by the automatic communication system for processing by the computer application.

The automatic communication system 10 may also include an internet server 500, wherein the computer application may operate from the internet server, wherein the two computer applications can operate from said internet server 500.

The second communication system 200 may be formed as a smart phone or as any computer device adapted to send and receive communications and information.

FIG. 9 utilization of cell phones for illustration does not signify the automatic texting system is limited to telephones with voice phone call service provided by cell phone companies. Rather, the voice phone call services may be provided by traditional telephone company or by a VOIP telephone company, domestically or outside the United States.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A method for automatic text messaging during and after communications between first and second communication systems, said method for automatic text messaging comprising the steps of:
    providing a first communication system including:
        a receiver; and
        a transmitter;
    providing second communication system including:
        a receiver; and
        a transmitter;
    wherein said first and second communication systems are adapted to electronically communicate with one another; and
    providing an automatic communication system including:
        a receiver;
        a transmitter; and
        computer processing components;
        wherein said automatic communication system is adapted to be electronically connected between said first and second communication systems; and
    providing a computer application;
        wherein said computer application is encoded within said computer processing components of said automatic communication system;
        wherein said computer application is adapted to monitor said communications between said first and second communication systems;
        wherein said computer application performs the follow steps:
            a. receives communications between said first and second communication systems;
            b. provides a menu of options to said second communication system to choose from;
            c. receives a response from said second communication system choosing an option;
            d. provides a predetermined response for each of said options; and
            e. depending on said responses by said second communication system, sends text messages to said second communication system;
    wherein said second communication system initiates communication with said first communication system;
    wherein said automatic communication system sends intermittent text messages to said second communication systems during communications between said first and second communication systems; and
    wherein said automatic communication system is adapted to send text messages to said second communication system after said second communication system ends communications with said first communication system.

2. The method for automatic text messaging of claim 1, wherein said second communication system includes a keypad; and wherein said response to said menu of options is chosen by a user of said second communication system via said keypad.

3. The method for automatic text messaging of claim 1, wherein said response to said menu of options is chosen by a user of said second communication system via a voice command by said user.

4. The method for automatic text messaging of claim 1, wherein said computer application further performs the following steps of:
    f. receiving from the telephone company the phone number of the party placing the voice phone call; and g. saving said phone number; and h. receiving from the telephone company data showing the voice phone call routing selected by the calling party; and i. selecting a text message from the system's library based upon the voice phone call routing selected by the caller; and j. transmitting to a texting company the text message content to be sent and the instructions for sending said text message to the calling party's telephone number.

5. The method for automatic text messaging of claim 4, wherein said text messages are sent to the calling party's telephone number during an ongoing voice phone call.

6. The method for automatic text messaging of claim 5, wherein said periodic reminders include information based upon said verbal responses by said user of said second communication system.

7. The method for automatic text messaging of claim 4, wherein said automatic communication system includes a telephone company providing voice phone call and a texting company providing text message services.

8. The method for automatic text messaging of claim 7, wherein said text messages are sent through a texting company in response to a voice phone call received through a telephone company.

9. The method for automatic text messaging of claim 7, wherein said telephonic services of said telephone phone company includes providing voice mailboxes; wherein said voice mailboxes are adapted to retain and deliver voice messages to said second communication system.

10. The method for automatic text messaging of claim 1, wherein said second communication system is formed by a telephone company and an unrelated texting company.

11. The method for automatic text messaging of claim 1, wherein said computer application provides an auto-attendant providing said menu of options in the form of audio verbiage.

12. The method for automatic text messaging of claim 7, wherein said automatic texting communication system includes two companies providing communication services, such that a first is a telephone company used for voice phone call communications and the second is a texting company is used for sending text messaging.

13. The method for automatic text messaging of claim 12, wherein said computer application comprises two computer applications; wherein a first of said two computer applications is used for processing voice phone call communications, and a second of said two computer applications is used for processing text messaging.

14. The method for automatic text messaging of claim 13, wherein said verbal communications and said text messaging are combined by said automatic communication system for processing by said computer application.

15. The method for automatic text messaging of claim 1, wherein said automatic communication system includes an internet server; and wherein said computer application operates from said internet server.

16. The method for automatic text messaging of claim 13, wherein said automatic communication system includes an internet server; and wherein said two computer applications operate from said internet server.

17. The method for automatic text messaging of claim 1, wherein said step (e) performed by said computer application includes requesting consent from said second communication system prior to automatically sending text messages thereto.

18. The method for automatic text messaging of claim 4, wherein said computer application further performs the follow steps of:

k. providing an opt-out of text messages option which allows said second communication system to opt-out of text messages after an initial text message is received.

19. The method for automatic text messaging of claim 18, wherein said computer application further performs the following steps of:

l. automatically combining into one conversation voice and text communications.

20. The method for automatic text messaging of claim 12, wherein the companies providing voice phone call services and text messaging are not the same company.

21. The method for automatic text messaging of claim 20, wherein the automatic text messaging system is utilizable although either or both companies are replaced by substitute companies providing voice phone call communications or text messaging.

22. The method for automatic text messaging of claim 20, wherein verbal communications and text messaging functions are segregated between two different companies.

23. The method for automatic text messaging of claim 20, wherein the content of the text message is based upon the purpose and conversation of the underlying voice phone conversation.

24. The method of automatic text messaging of claim 20, wherein the text messaging is received by the first communication system telephone during an ongoing voice telephone conversation.

25. The method of automatic text messaging of claim 20, wherein the text message protocol may be SMS (short message service) or MMS (multimedia message service) or RCS (rich communication service) messaging.

26. The method of automatic text messaging of claim 20, wherein a person answering an inbound voice phone call is prohibited from determining whether a text message is sent and the content of a text message sent.

\* \* \* \* \*